United States Patent [19]

Kawamura

[11] Patent Number: 5,202,925
[45] Date of Patent: Apr. 13, 1993

[54] FM STEREOPHONIC RECEIVER

[75] Inventor: Katsuaki Kawamura, Saitama, Japan

[73] Assignee: Pioneer Electronic Corporation, Tokyo, Japan

[21] Appl. No.: 675,822

[22] Filed: Mar. 27, 1991

[30] Foreign Application Priority Data

Jun. 29, 1990 [JP] Japan ................. 2-68481[U]

[51] Int. Cl.⁵ .............................................. H04H 5/00
[52] U.S. Cl. .......................................... 381/13; 381/3; 381/10; 381/11
[58] Field of Search ................. 381/10, 11, 13, 3

[56] References Cited

U.S. PATENT DOCUMENTS

| | | |
|---|---|---|
| 3,673,342 | 6/1972 | Muller . |
| 4,029,906 | 6/1977 | Takahashi . |
| 4,032,717 | 6/1977 | Mallon . |
| 4,208,547 | 6/1980 | Simeau ................... 381/13 |
| 4,607,381 | 8/1986 | Shimizu . |
| 4,633,497 | 12/1986 | Ichikawa . |
| 4,841,572 | 6/1989 | Klayman ................... 381/1 |

FOREIGN PATENT DOCUMENTS 2461134 7/1975 Fed. Rep. of Germany .
3521099 7/1988 Fed. Rep. of Germany .

Primary Examiner—Jin F. Ng
Assistant Examiner—Edward Lefkowitz
Attorney, Agent, or Firm—Sughrue, Mion, Zinn, Macpeak & Seas

[57] ABSTRACT

An FM stereophonic receiver including an FM detector circuit for detecting an intermediate frequency signal, and for providing a main signal and a sub signal in response to the detected intermediate frequency signal, a first high cut circuit, connected to receive the main signal, for providing a first high cut signal, a high cut control circuit for providing a high cut control signal in accordance with a received signal field strength level, the first high cut circuit controlling a frequency characteristic of the main signal in accordance with the high cut control signal, a second high cut circuit for providing a second high cut signal, a separation control circuit for providing a separation control signal in accordance with the received signal field strength level, the second high cut circuit controlling a frequency characteristic of the sub signal in accordance with the separation control signal, and a stereophonic demodulation circuit for providing separated right and left channel signals.

1 Claim, 4 Drawing Sheets

FM STEREOPHONIC RECEIVER

BACKGROUND OF THE INVENTION

This invention relates to an FM stereophonic receiver having an ARC (automatic reception control) function.

FIG. 7 is a block diagram showing the arrangement of essential parts of a conventional FM stereophonic receiver.

In FIG. 7, reference numeral 1 designates an FM detector circuit which detects an intermediate frequency signal IF applied thereto, to output a main signal $S_M$ and a sub signal $S_S$.

Reference numeral 2 designates a high cut circuit which operates as follows: The high cut circuit 2 controls the frequency characteristic of the main signal $S_M$ outputted by the FM detector circuit 1 in accordance with a high cut control signal $S_H$ provided by a high cut control circuit 8. The high cut control circuit 8 outputs control signal $S_H$ according to a received signal field strength level. The high cut circuit 2 outputs a high cut signal $S_{H1}$ according to the main signal $S_M$ and the control signal $S_H$.

Reference numeral 3 designates a variable attenuation circuit. The variable attenuation circuit 3 attenuates the sub signal $S_S$ outputted by the FM detector circuit 1 in accordance with a separation control signal $S_{SP}$ provided by a separation control circuit 3A. The separation circuit 3A outputs control signal $S_{SP}$ according to a received signal field strength level. The variable attenuation circuit 3 provides an attenuation signal $S_A$ in accordance with the sub signal $S_S$ and the control signal $S_{SP}$.

Reference numeral 4 designates a stereophonic demodulation circuit which operates as follows: The stereophonic demodulation circuit 4 separates right and left channel signals $S_R$ and $S_{LA}$ according to the high cut signal $S_{H1}$ outputted by the high cut circuit 2 and the attenuation signal $S_A$ outputted by the variable attenuation circuit 3, and outputs the right and left channels signals thus separated.

The FM stereophonic receiver thus organized operates as follows:

The separation control circuit 3A outputs the separation control signal $S_{SP}$ according to the received signal field strength level in such a manner that, when the received signal field strength level is high, the amount of attenuation of the variable attenuation circuit 3 is decreased, whereas when the received signal field strength level is low, the amount of attenuation is increased. Thus, the amount of attenuation of the variable attenuation circuit 3 continuously changes in accordance with the received signal field strength level.

Therefore, the sub signal $S_S$ outputted by the FM detector circuit 1 is attenuated according to the received signal field strength level, and the right and left channel signals outputted by the stereophonic demodulation circuit 4 is improved in S/N ratio.

The separation control is effected when the received signal field strength level is within the range of, for instance, from 45 dB/$\mu$V to 25 dB/$\mu$V, whereas the frequency control is carried out when the received signal field strength level is less than 35 dB/$\mu$V.

The conventional FM stereophonic receiver designed as described above suffers from the following difficulty: Since the sub signal $S_S$ is attenuated according to the received signal field strength, when the received signal field strength level becomes relatively low, the sub signal $S_S$ is completely attenuated, with the result that the stereophonic broadcast turns into a monaural broadcast.

SUMMARY OF THE INVENTION

Accordingly, an object of this invention is to eliminate the above-described difficulty accompanying a conventional FM stereophonic receiver. More specifically, an object of the invention is to provide an FM stereophonic receiver in which the range of received signal field strength levels permitting stereophonic signal reception is increased.

An FM stereophonic receiver according to the invention has instead of the variable attenuation circuit, a second high cut circuit which applies a second high cut signal to the stereophonic demodulation circuit which is obtained by controlling the frequency characteristic of the output sub signal of the FM detector circuit in accordance with the separation control signal which the separation control circuit outputs according to the received signal field strength level.

In the FM stereophonic receiver of the invention, the second high cut circuit outputs the second high cut signal which is obtained by controlling the frequency characteristic of the sub signal according to the separation control signal; that is, the second high cut signal is outputted even when the received signal field strength level becomes low.

Since the second high cut circuit outputs the second high cut signal even when the received signal field strength level becomes low, the stereophonic demodulation circuit can separate the right and left channel signals, and output these channel signals.

DETAILED DESCRIPTION OF THE PREFERRED EMBODIMENTS

Figure 7:
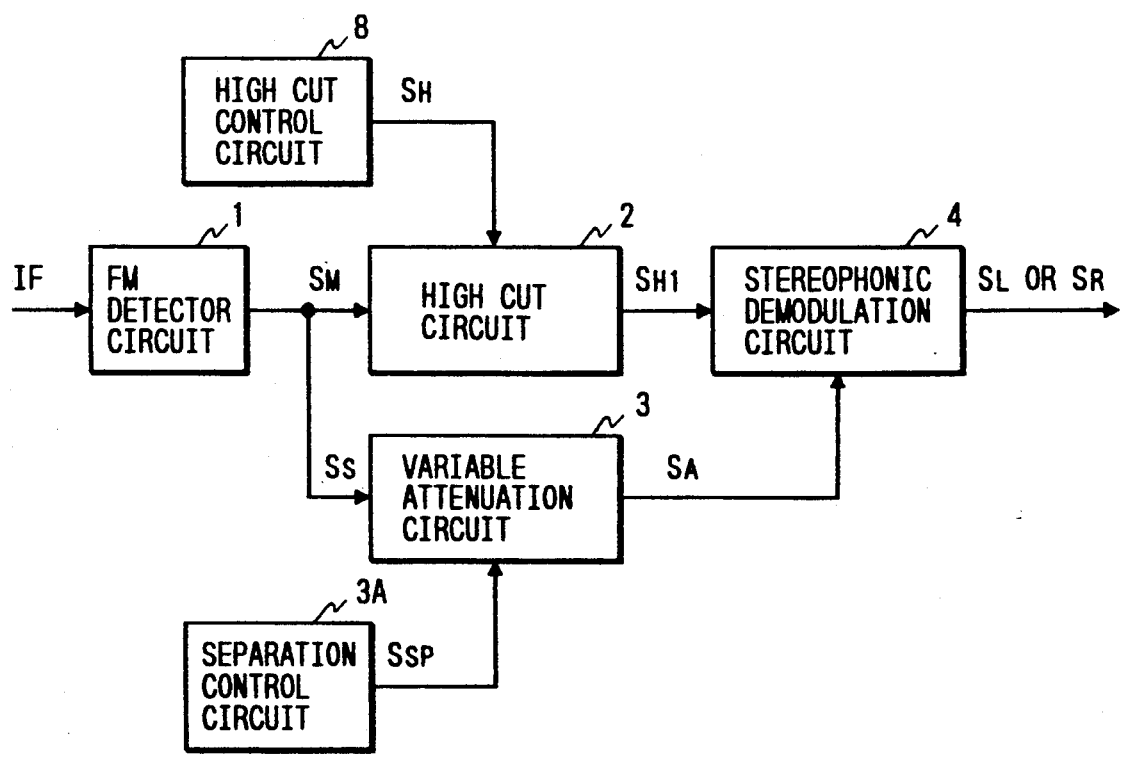
FIG. 7 is a block diagram showing the arrangement of essential parts of a conventional FM stereophonic receiver.

Preferred embodiments of the present invention will be described with reference to the accompanying drawings. In the drawings, those components which have been previously described with reference to FIG. 7 (the prior art) are designated by the same reference numerals or characters.

Figure 1:
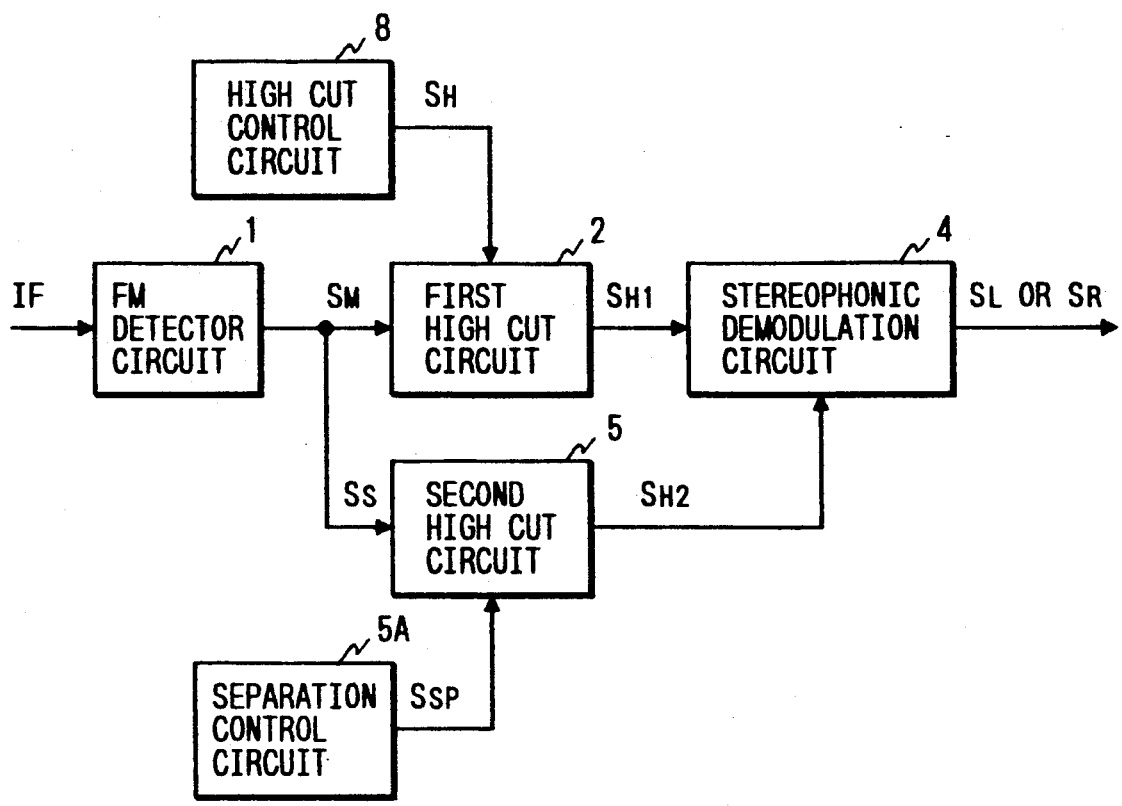
FIG. 1 is a block diagram showing the arrangement of essential parts in a first embodiment of an FM stereophonic receiver according to this invention.

FIG. 1 is a block diagram showing the arrangement of essential parts of a first embodiment of an FM stereophonic receiver according to the invention.

In FIG. 1, reference numeral 5 designates a second high cut circuit. The second high cut circuit 5 controls the frequency characteristic of the sub signal $S_S$ outputted by the FM detector circuit 1 in accordance with the separation control signal $S_{SP}$ provided by the separation control circuit 5A which outputs signal $S_{SP}$ according to the received signal field strength level. The second high cut circuit outputs a second high cut signal $S_{H2}$.

Figure 2:
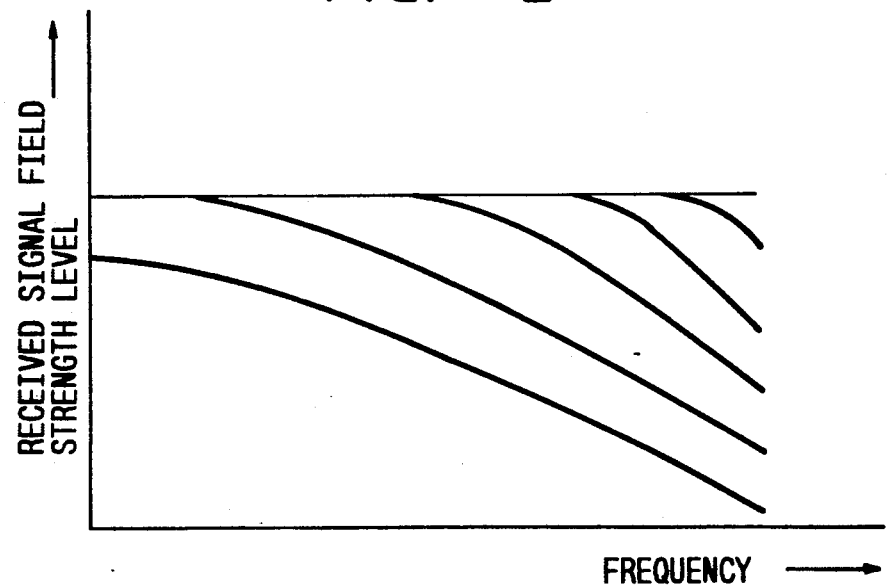
FIG. 2 is a graphical representation showing a characteristic of a second high cut circuit.

FIG. 2 shows a characteristic of the second high cut circuit. In FIG. 2, the horizontal axis represents frequencies, while the vertical axis represents received signal field strength levels.

The operation of the FM stereophonic receiver shown in FIG. 1 will now be described.

The second high cut circuit 5 outputs the second high cut signal $S_{H2}$ as shown in FIG. 2, in accordance with the separation control signal $S_{SP}$ which the separation control circuit 5A provides.

Hence, even when the received signal field strength level becomes low, the second high cut circuit 5 outputs the second high cut signal $S_{H2}$. Therefore, the stereophonic demodulation circuit 4 can separate the right and left channel signals $S_R$ and $S_L$ according to the first high cut signal $S_{H1}$ outputted by the first high cut circuit 2 and the second high cut signal $S_{H2}$ outputted by the second high cut circuit 5, and the outputted right and left channel signals are thus separated.

As is apparent from the above description, in the embodiment, even when the received signal field strength level becomes low, the second high cut circuit 5 outputs the second high cut signal $S_{H2}$, and accordingly the range of received signal field strength levels permitting stereophonic signal reception is increased relative to the conventional receiver.

Further, when the received signal field strength level becomes low, the high frequency components in the second high cut signal $S_{H2}$ are cut as shown in FIG. 2, and therefore the S/N ratio will not be decreased.

Figure 3:
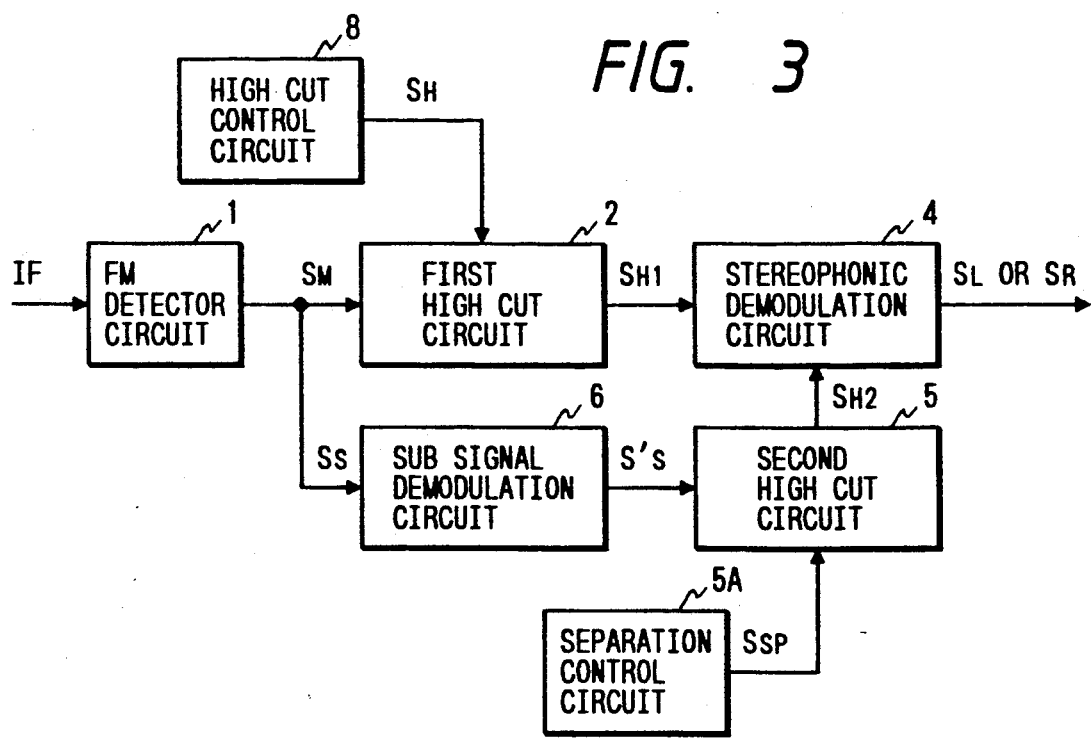
FIGS. 3 through 6 are block diagrams showing the arrangements of essential parts in second through fifth embodiments, respectively, of the FM stereophonic receiver according to the invention.
Figure 4:
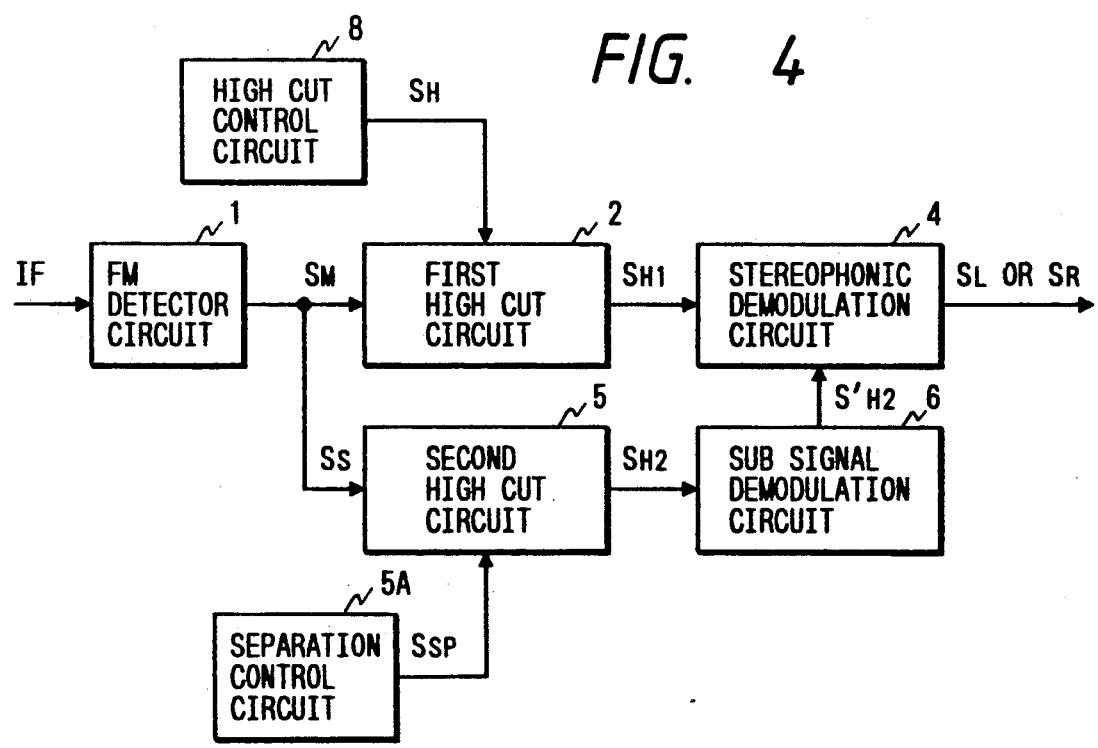

FIGS. 3 and 4 are respective block diagrams showing the arrangements of essential parts of second and third embodiments of the FM stereophonic receiver according to the invention.

In FIGS. 3 and 4, reference numeral 6 designates a sub signal demodulation circuit. In FIG. 3, the sub signal demodulation circuit 6 demodulates the sub signal $S_S$ applied thereto, to output a demodulated sub signal $S'_S$. Similarly, in FIG. 4, the sub signal demodulation circuit 6 demodulates the second high cut signal $S_{H2}$ applied thereto, to output a demodulated second high cut signal $S'_{H2}$.

Figure 5:
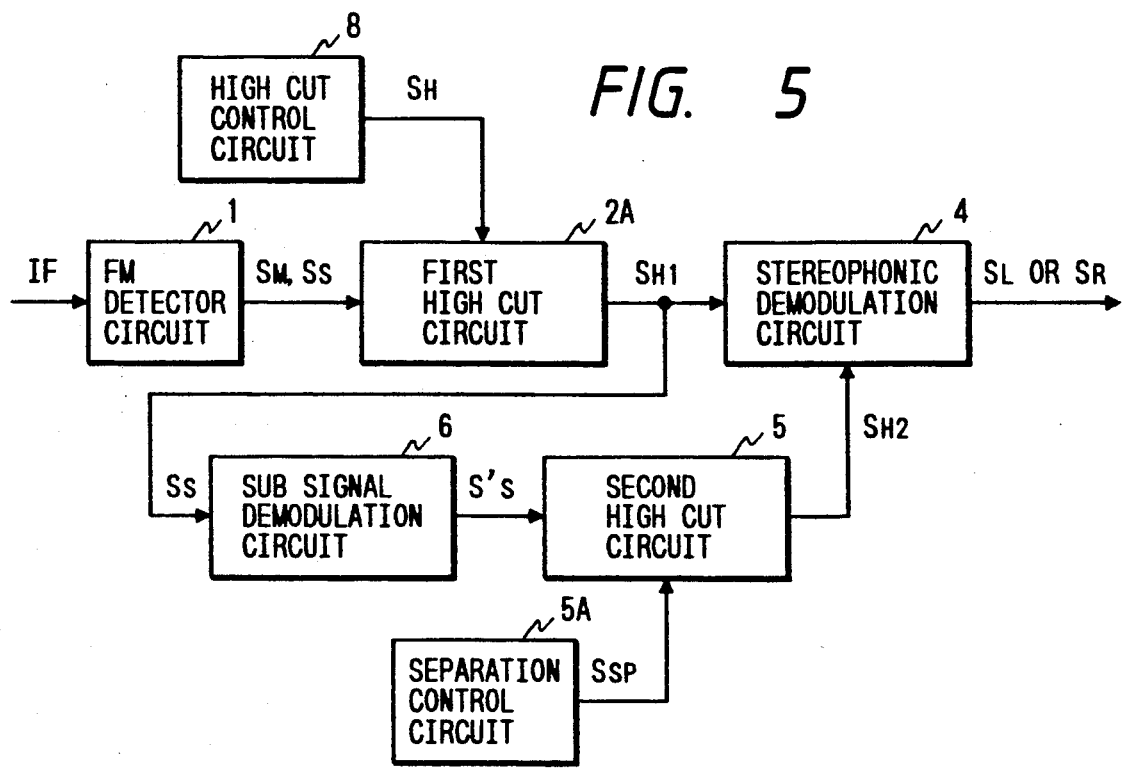
Figure 6:
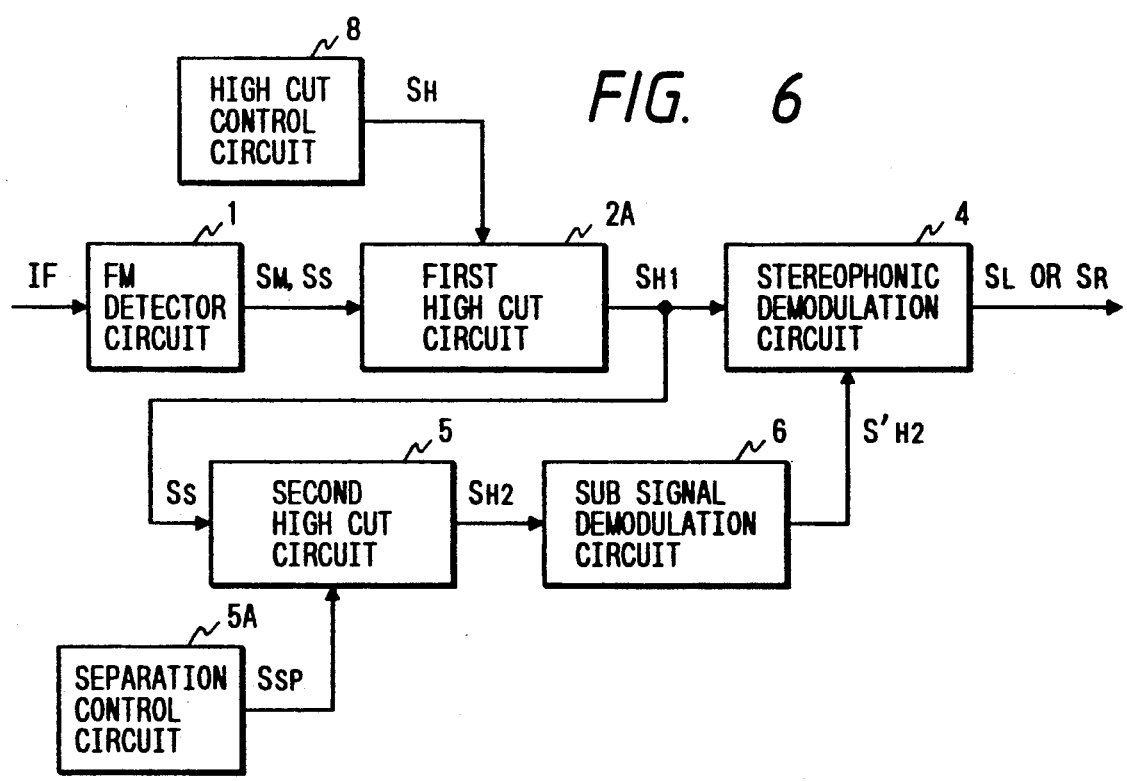

FIGS. 5 and 6 are respective block diagrams showing the arrangements of essential parts of fourth and fifth embodiments of the FM stereophonic receiver according to the invention. In FIGS. 5 and 6, those parts which have been previously described with reference to FIGS. 1, 3 and 4 are designated by the same reference numerals or characters.

In FIGS. 5 and 6, reference character 2A designates a first high cut circuit. In each of FIGS. 5 and 6, the first high cut circuit 2A controls the frequency characteristic of the main signal $S_M$ outputted by the FM detector circuit 1 in accordance with the high cut control signal $S_H$ which the high cut control circuit 8 outputs according to a received signal field strength level, to output the first high cut signal $S_{H1}$ and the sub signal $S_S$.

Each of the FM stereophonic receivers shown in FIGS. 3 through 6 operates similarly as the one shown in FIG. 1, thus providing the same effects.

As was described above, in the FM stereophonic receiver of the invention comprises the second high cut circuit which applies the second high cut signal to the stereophonic demodulation circuit which is obtained by controlling the frequency characteristic of the output sub signal of the FM detector circuit in accordance with the separation control signal which the separation control circuit outputs according to the received signal field strength level. That is, in the FM stereophonic receiver of the invention, even when the received signal field strength level becomes low, the second high cut circuit applies the second high cut signal to the stereophonic demodulation circuit.

Thus, the range of received signal field strength levels permitting stereophonic signal reception is increased.

What is claimed is:

1. An FM stereophonic receiver comprising:
   an FM detector circuit for detecting an intermediate frequency signal, and for providing a main signal and a sub signal in response to the detected intermediate frequency signal;
   a first high cut circuit, connected to receive the main signal, for providing a first high cut signal;
   a high cut control circuit for providing a high cut control signal in accordance with a received signal field strength level, said first high cut circuit controlling a frequency characteristic of the main signal in accordance with the high curt control signal;
   a sub signal demodulation circuit, connected to receive the sub signal;
   a second high cut circuit, connected to receive an output of said sub signal demodulation circuit, for providing a second high cut signal;
   a separation control circuit for providing a separation control signal in accordance with the received signal field strength level, said second high cut circuit controlling a frequency characteristic of the sub signal in accordance with the separation control signal and providing the second high cut signal even if the received signal field strength level is relatively low; and
   a stereophonic demodulation circuit, connected to receive the first and second high cut signals, for providing separated right and left channel signals.

* * * * *